United States Patent Office 3,275,575
Patented Sept. 27, 1966

3,275,575
CATION EXCHANGE MEMBRANE FROM A SULFATED POLYVINYL ALCOHOL
Merlyn W. Fogle, Toledo, Ohio, assignor to Eltra Corporation, a corporation of Ohio
No Drawing. Filed Apr. 17, 1962, Ser. No. 188,247
6 Claims. (Cl. 260—2.2)

This invention relates to artificial resins; more particularly to cation exchange resins.

These cation exchange resins are particularly suited to certain applications, for example, fuel cells where their properties offer advantages not found in other resins. For use with most electrochemical applications, the resin must be in the form of thin films or membranes. The water insoluble sulfated polyvinyl alcohol resin incorporating the invention is readily prepared in a membrane form, and the thickness of the membrane is easily adjusted from a thickness of several millimeters to very thin films of a few tenths of a millimeter. The choice of thickness rests upon the specific application. The very thin membranes have been found to be more durable than similar membranes made from other resins. This is probably due to the greater flexibility of the base resin, i.e., polyvinyl alcohol.

In many applications the ion exchange resin in the form of a membrane is used to separate two electrodes as electrical insulation, while permitting the transfer of ions. In such cases a large area of contact between the resin membrane and the electrode is needed, which was difficult to attain with the previously known resins as they were hard and often somewhat brittle. With such earlier resins slight imperfections or points protruding from the surface of the electrode prevented complete contact between the electrode and the resin, thus introducing what is referred to as contact resistance.

Sulfated polyvinyl alcohol resin forms a membrane which is soft and flexible, permitting the resin to mold about these slight imperfections on the surface of the electrode when pressure is applied. The resulting greater actual area of contact lowers the electrical resistance between the electrodes and the resin.

The electrical resistance between the electrodes is the sum of the contact resistances mentioned in the previous paragraph and the resistance within the membrane. This latter may be referred to as the ionic resistance. This resistance is related to the number and kind of ions present. In the cation type of resin it is the highly mobile hydrogen ion which is the conducting specie. Its numbers are related to the number of and kind of acidic groups present as well as to the water content of the resin.

The hydrogen sulfate group is highly ionized and produces many more hydrogen ions per gram mole than weaker acids such as carboxylic acids, etc. The alcohol hydrogen sulfate molecules are stable molecules but may be hydrolyzed under certain conditions. To establish that the membranes incorporating the invention had satisfactory stability, they were digested in water at 50° C. for 16 hours and no change in their ion exchange capacity was found.

By controlled sulfation these resins can be made to contain 2–3 milliequivalents of hydrogen sulfate per gram of dry resin. These groups were determined by neutralization with standard alkali. Under these conditions the water content was 50–60% of the total weight after equilibration in distilled water. A larger number of active groups can be introduced, but with the resulting higher water content the membranes become too fragile for practical purposes. Fewer active groups raise the electrical resistance of the membranes beyond a practical point.

The composition of matter referred to as a water insoluble sulfated polyvinyl alcohol is the essence of this invention. Furthermore, the process by which these resins and films are made constitutes an essential part of this invention. Sulfated polyvinyl alcohol, as ordinarily prepared, is very soluble in water and therefore totally unsuitable for ion exchange resins and for membranes.

It is therefore a principal object of this invention to provide a water insoluble sulfated polyvinyl alcohol which is suitable for use as a membrane.

It is a further object of this invention to provide a method of making films from water insoluble sulfated polyvinyl alcohol which have ion exchange properties.

It is a further object of this invention to provide a cation exchange resin suitable for membranes for use in fuel cells.

Other objects and advantages of this invention relating to the arrangement, operation and function of the related elements of the structure, to various details of construction, to combinations of parts and to economies of manufacture, will be apparent to those skilled in the art upon consideration of the following description and appended claims.

Insoluble sulfated polyvinyl alcohol membranes (and resins) are best prepared by sulfation of insolubilized polyvinyl alcohol. The insolubilization of polyvinyl alcohol can be accomplished in several ways. A reaction with a dioxirane is preferable. The specific product chosen was the result of the reaction of epichlorohydrin with glycerin. It is to be emphasized that all compounds containing two or a multiplicity of oxirane groups may also be used. The product used was chosen because of its water solubility, which simplified subsequent processing steps, and because it was readily available as an article of commerce. By such a reaction, stable co-valent bonds are formed which are neither hydrolyzed nor destroyed in any manner under conditions ordinarily encountered. The course of the reaction causes crosslinking of the polymer chains. This crosslinking results in greatly lowered solubility in all solvents; in effect the resin formed becomes insoluble.

Insoluble polyvinyl alcohol membranes (and resins) of the type mentioned are disclosed in application Serial No. 188,246, filed April 17, 1962, and now Patent No. 3,232,916, by the inventor and assigned to the same assignee.

Considerable variation of properties can be obtained by changing the composition of the mixture. As the result of consideration of the resultant physical properties, ease of sulfation and low electrical resistance of the membranes formed, the conditions given in Example I are best for the purpose. Other applications may require slightly different properties and changes in proportions of ingredients, but the basic process will remained unchanged.

Sulfation conditions also influence the properties of the ion exchange resin. Sulfation can be accomplished by reaction with chlorosulfonic acid in acetic acid, sulfur trioxide in acetic acid and by the sulfur trioxide complex of pyridine. The latter method, although reported by others as a means of sulfating polyvinyl alcohol, was not found to be as satisfactory as either of the first mentioned methods. The use of other solvents should not be excluded; however, less satisfactory results were given by sulfation in sulfuric acid (i.e., fuming sulfuric acid or oleum), reaction of chlorosulfonic acid in carbon tetrachloride or chloroform.

By changes in time and temperature of reaction as well as variations of concentration of reagents a change in the final product can be produced.

After studying the reactions and the influence of reaction conditions upon the properties of the membrane, the conditions set forth in Examples IV and V gave the results most nearly suitable to the purpose. Changes in reaction conditions will produce ion exchange resins and membranes with different properties but still are well within the scope of this invention.

*Example I*

Polyvinyl alcohol (40 pts.) was dissolved in water (400 pts.) by warming to 70–80° C. to hasten the solution. After cooling to 20–30° C. four parts of the diglycidyl ether of glycerin (Shell resin 812) was added. The solution was well mixed while adding one part of a commercial 40% fluoroboric acid solution.

The resulting mixture was allowed to stand at room temperature for several hours to remove all visible air bubbles. A uniform layer was cast upon a smooth surface (glass or a polished metal) using a doctor knife for spreading. After air drying the film was lifted from the surface, clamped in a frame to prevent curling and cured at 170° C. for 15–20 minutes.

This membrane was water insoluble and could be sulfated by methods in Examples V and VI to make ion exchange membranes.

After chopping (or grinding) the resulting powdered film was sulfated by the same methods to make a cation exchange resin.

*Example II*

As in Example I except that for fluoroboric acid is substituted 1 part of diethylene triamine. Drying and curing resulting in a golden colored water insoluble film.

*Example III*

A solution prepared in Example I or II was poured over a reinforcing mat of fiberglass and/or Dynel fibers. After drying and curing as in Example I, reinforced membranes of superior tensile strength were formed. These were sulfated by the methods given in Examples V and VI.

*Example IV*

Cellulose mats, similar to chemical filter paper, were dipped in a solution as prepared in Example I. After drying in air at 20–30° C. they were cured 15–20 minutes @ 160–170° C. These membranes could be sulfated to make ion exchange membranes by methods given in Examples V and VI.

*Example V*

The insoluble polyvinyl alcohols (1 part) (either as a membrane or ground resin) was immersed in a mixture of glacial acetic acid (95 parts) and fuming sulfuric acid (5 parts). The latter contained 20–30% excess sulfur trioxide. The temperature was controlled at 50° C. for two hours. After washing (4 times) with distilled water, the cation exchange membrane contained 1.0–2.0 milliequivalents of acid sulfate groups per gram dry resin.

*Example VI*

Crosslinked polyvinyl alcohol (1 part) as prepared in Examples I, II, or III was sulfated by immersion in a solution of chlorosulfonic acid (6 parts) in glacial acetic acid (20 parts). The reaction was controlled by maintaining the temperature at 50° C. for five hours. After washing free of acid 0.5 to 1.0 milliequivalent of acid sulfate group remained per gram of dry resin.

The preparations described form resins from polyvinyl alcohol which are insoluble in water and can be sulfated to form hydrogen-sulfate groups attached to the base resin, thus a cation exchange resin is formed. It is easily prepared in the form of a thin film and well suited for many applications in the fields of electrochemistry, ion exchange, de-ionization or desalting of water, and other applications where the passage of ions (cations) is to be permitted but no flow of electrons as such can be allowed. These membranes have been used as the "solid" electrolyte in fuel cells.

It is to be understood that the above detailed description of the present invention is intended to disclose an embodiment thereof to those skilled in the art, but that the invention is not to be construed as limited in its application to the details set forth hereinabove since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The method of making a cation exchange membrane comprising mixing 40 parts polyvinyl alcohol in 400 parts water with 4 parts diglycidyl ether of glycerin and 1 part diethylene triamine, forming the mixture as a membrane and heat curing at 160–170° C., and thereafter sulfating the membrane in a mixture of 95 parts glacial acetic acid and 5 parts sulfuric acid, the latter containing 20–30% excess sulfur trioxide, at a temperature of 50° C.

2. A cation exchange membrane comprising a mixture of polyvinyl alcohol, diglycidyl ether of glycerin and fluoroboric acid, formed as a membrane and heat cured, and thereafter sulfated in a mixture of glacial acetic acid and chlorosulfonic acid.

3. A cation exchange membrane comprising a mixture of polyvinyl alcohol in water, diglycidyl ether of glycerin and diethylene triamine, forming the mixture as a membrane and heat curing, and thereafter sulfating the membrane in a mixture of glacial acetic acid and chlorosulfonic acid.

4. A cation exchange membrane comprising a mixture of polyvinyl alcohol in water, diglycidyl ether of glycerin and diethylene triamine, formed as a membrane and heat cured, and thereafter sulfated in a mixture of glacial acetic acid and sulfuric acid.

5. A cation exchange membrane comprising a mixture of polyvinyl alcohol, diglycidyl ether of glycerin and fluoroboric acid, formed as a membrane and heat cured, and thereafter sulfated in a mixture of glacial acetic acid and sulfuric acid.

6. The method of making a cation exchange membrane comprising mixing 40 parts polyvinyl alcohol in 400 parts water with 4 parts of diglycidyl ether of glycerin, and 1 part 40% fluoroboric acid, pouring the mixture out to form a membrane and air drying and thereafter curing the air dried membrane at about 170° C.

References Cited by the Examiner

UNITED STATES PATENTS

| 2,733,231 | 1/1956 | Bauman | 260—2.2 |
| 3,042,667 | 7/1962 | Flodin | 260—209 |

FOREIGN PATENTS

| 727,476 | 4/1955 | Great Britain. |
| 4,790 | 5/1960 | Japan. |

OTHER REFERENCES

Daul: Industrial and Engineering Chemistry, vol. 46, pp. 1042–1045, May 1954.

WILLIAM H. SHORT, *Primary Examiner.*

JOSEPH R. LIBERMAN, *Examiner.*

J. C. MARTIN, *Assistant Examiner.*